United States Patent [19]

Peter

[11] Patent Number: 4,492,398

[45] Date of Patent: Jan. 8, 1985

[54] RESILIENT VEHICLE BUMPER INDIRECTLY SECURED TO A RIGID SUPPORT

[75] Inventor: Dietmar Peter, Hemmingen, Fed. Rep. of Germany

[73] Assignee: Dr. Ing. h.c.F. Porsche AG, Fed. Rep. of Germany

[21] Appl. No.: 371,205

[22] Filed: Apr. 23, 1982

[30] Foreign Application Priority Data

May 2, 1981 [DE] Fed. Rep. of Germany ....... 3117379

[51] Int. Cl.³ ............................................. B60R 19/08
[52] U.S. Cl. ..................................... 293/120; 296/155
[58] Field of Search ................. 293/102, 120–122, 293/133, 136, 154, 155

[56] References Cited

U.S. PATENT DOCUMENTS 2,030,978  2/1936  Fortier et al. ..................... 293/155
3,926,463  12/1975  Landwehr et al. ............... 293/136

FOREIGN PATENT DOCUMENTS 2316220  10/1974  Fed. Rep. of Germany ...... 293/120
2457676   6/1976  Fed. Rep. of Germany ...... 293/121
2702691   7/1978  Fed. Rep. of Germany ...... 293/155

*Primary Examiner*—Randolph Reese
*Assistant Examiner*—Dennis H. Pedder
*Attorney, Agent, or Firm*—Craig & Burns

[57] ABSTRACT

A bumper formed by a rigid support of U-shaped cross section and a resilient guard covering it, with the guard having approximately horizontally aligned guide bars which rest against parallel legs of the rigid support and interact in a reinforcing manner with holding fixtures of the rigid support. For purposes of safe assembly and avoidance of overstressing the guard, additional horizontally-running cross bars are located at a vertical distance from the guide bars and include portions that protrude beyond the support. The protruding portions of the cross bars are connected to each other by means of a fastening link.

9 Claims, 2 Drawing Figures

RESILIENT VEHICLE BUMPER INDIRECTLY SECURED TO A RIGID SUPPORT

BACKGROUND AND SUMMARY OF THE INVENTION

The present invention relates to a bumper for vehicles, and more particularly, for motor vehicles, which is formed by a cross-sectionally U-shaped rigid support and a resilient guard covering it, with the guard resting with approximately horizontally aligned guide bars against parallel legs of the cross-sectionally U-shaped support and interacting in a reinforcing manner with holding fixtures of the support.

A bumper of the aforementioned type has been proposed in DE-OS No. 24 57 676, wherein one guide bar of the guide is received in a hook-like holding fixture of the support in a manner enabling the guide bar to deflect from its normal position in case of unfavorable shock loads acting aginst the guard. The steps then required to return it into the original assembly position are particularly complicated. The other guide bar is attached by means of bolts, resulting in damage being caused by even minor impacts on the guard in the area of its attachment (shearing stress).

A principal object of the present invention, therefore, is to provide for safe and simple assembly of the guard, and for its ability to absorb occurring stresses without damage.

This object is attained, according to a preferred embodiment of the present ivention, by, in addition to providing the resilient guard covering with horizontally aligned guide bars which interact with holding fixtures of a rigid support, providing horizontally-disposed cross bars which protrude beyond the support and are connected to each other by a fastening link.

A principal advantage achieved by the present invention resides in the fact that, by virtue of the bars extending beyond the support, and being connected to each other, simple and safe assembly is made possible, with the guide bars resting functionally, i.e., avoiding shear stresses, against the support and/or its holding fixtures.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
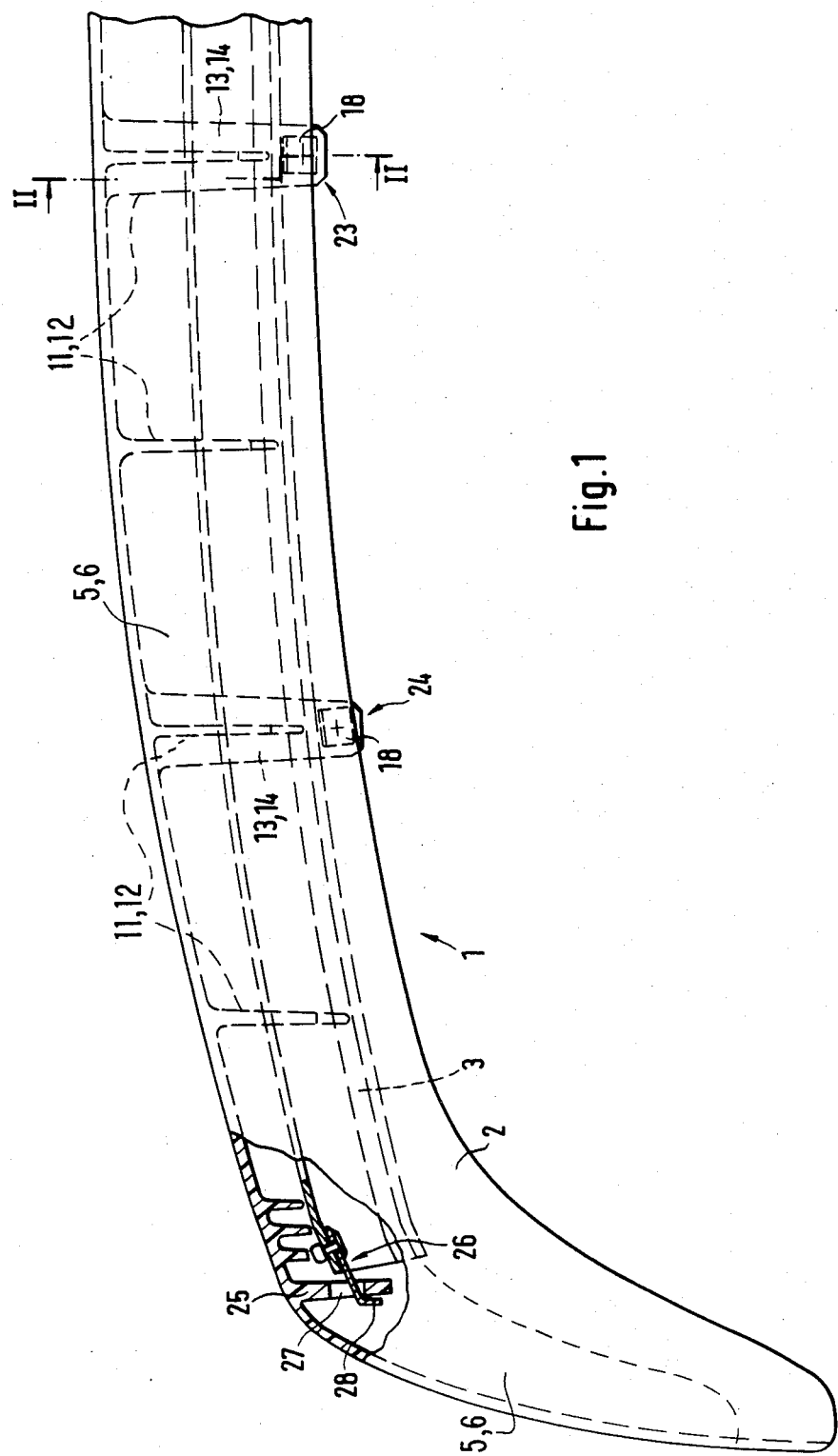
FIG. 1 is a top view of the bumper according to the present invention.

The bumper is formed by a resilient guard 2 made of plastic and a rigid, cross-sectional U-shaped, support 3 made of metal or a suitable non-metallic material, e.g., fiberglass reinforced plastic.

The guard 2 is provided with a molded face 4 which forms the outline of the bumper 1. The guard extends across the entire width of a motor vehicle, which is not shown, and is intended to be that portion of the bumper arrangement which is initially contacted on impact and to provide an aesthetically pleasing portion of the vehicle body.

Extending away from and formed intergrally with the molded face 4, in the direction of support 3, are horizontally aligned guide bars 5, 6, which rest against legs 7, 8 of the support 3. At the extreme edges of its legs 7, 8, the support 3 has hook-like holding fixtures 9, 10 which serve to support guide bars 5, 6 and the vertical ribs 11, 12 connected thereto. The ribs 11, 12 are adapted to the shape of the holding fixtures 9, 10, i.e., shaped so as to have a portion that will fit therein.

The guard 2 is also provided with additional cross bars 13, 14. These additional bars are located at a distance A relative to the guide bars 5, 6 and are elongated so as to protrude, at 15, 16, beyond a generally perpendicular boundary plane 17 at the fixture end of the legs 7, 8 of the support 3. Vertical ribs 11, 12 extend between and interconnect each of bars 5 and 6 to a respective additional bar 13 or 14. Thus, it can be seen that each respective holding fixture 9, 10 of the support 3 has the end of a respective bar 5, 6 and a portion of a respective shaped rib 11, 12 associated therewith for positioning and support of the guard 2.

In order to secure the guard 2 to support 3 fastening link 18 extends between and is attached to the protruding portions 15, 16, and is U-shaped in cross section. A connecting bar 19, which interconnects legs 20, 21 of the fastening link 18, runs adjacent to the boundary plane 17.

The leg 20 and the protruding portion 15 are connected to each other by means of a rivet. However, it is possible to use bolts, clips, or the like instead of the rivet. Conversely, the connecting bar 19 penetrates a slot opening 22 in the protruding portion 16, with the leg 21 embracing the underside of protruding portion 16.

Figure 2:
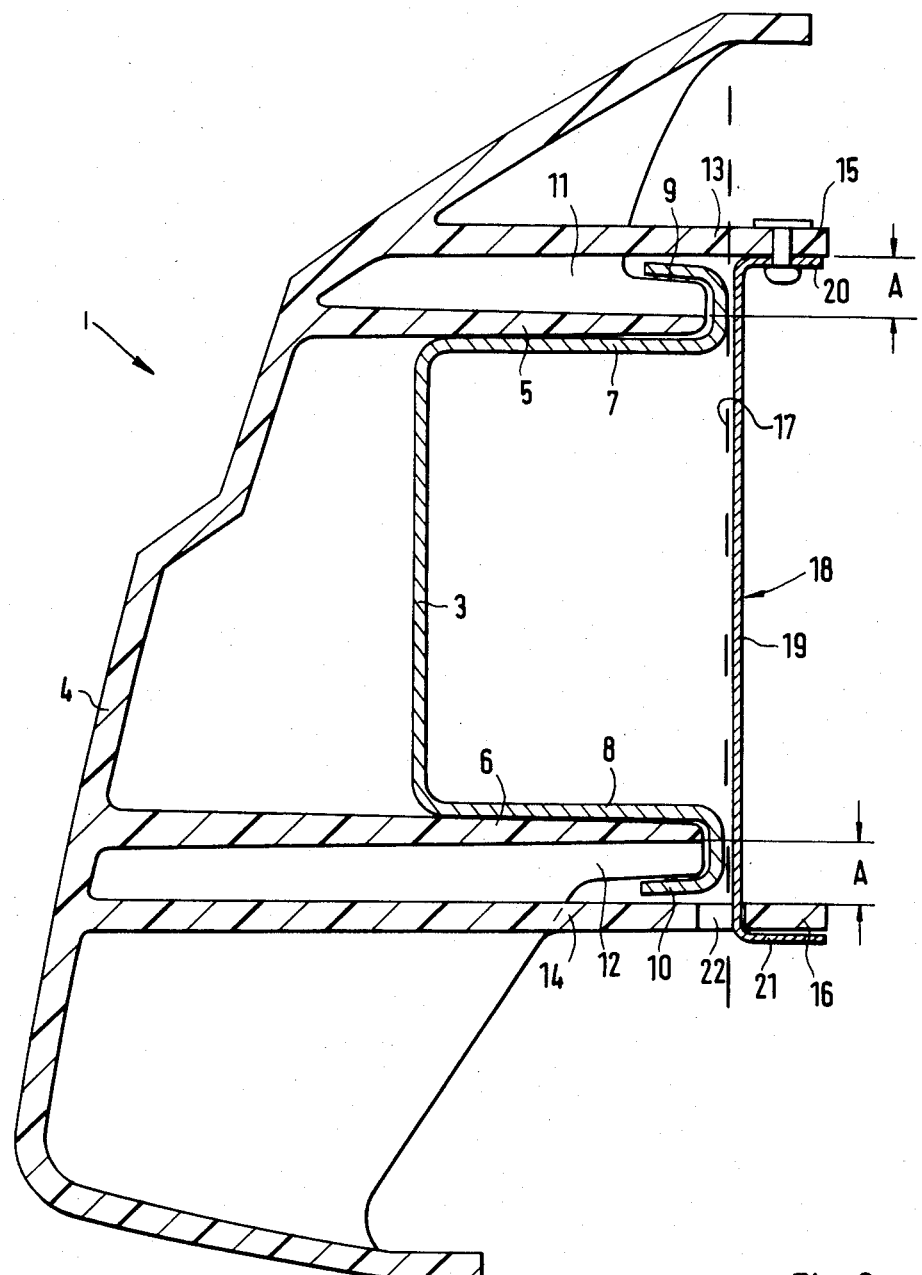
FIG. 2 is an enlarged cross-sectional view taken along the line II—II in FIG. 1.

As shown in FIG. 1, the cross bars 13, 14 and/or the fastening link 18 are provided only locally, that is at location 23 and 24. That is, the cross bars 13, 14 are arranged in horizontally spaced, vertically aligned pairs with a respective vertical link 18 provided for each pair formed by a bar 13 and a bar 14. As shown in FIG. 2, the guide bars 5, 6 extend along the inside of the inner surface of the guard 2 in a generally continuous manner. Thus, the guard 2 is supported in a generally continuous manner over the full length of the support 3.

The support 3 is laterally bounded by vertically extending ribs 25 of the guard 2. In order to establish a connection between the ribs 25 and the support 3, a hook-like clamp 26 is attached to the support 3 and penetrates a slot opening 27 of the ribs 25 so as to have a bent end 28 embracing an outer side of ribs 25.

It will be readily apparent to those skilled in the art the guard 2 is not directly secured to any rigid or substantially rigid vehicle body structure. The advantage being that upon impact there will not be any damage to the guard 2 due to structural failure due to rigid attachment. Clearly, upon impact, the guard 2 will transmit any forces through guide bars 5 and 6, and to some degree ribs 11 and 12, to the holding fixtures 9 and 10 of support 3. Provided that there is deformation of the guard 2 generally in the direction of the support 3, the attachment to the support 3 by fastening links 18 will be unaffected due to the fact that the links 18 are behind the support 3.

While I have shown and described a single embodiment in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. A bumper for vehicles, and more particularly, for motor vehicles, comprising a rigid support of U-shaped cross section and a resilient guard, said rigid support including holding fixtures and the guard having at least one pair of generally vertically aligned guide bars resting against opposed parallel legs of the U-shape of the rigid support, said guide bars and holding fixtures interacting in a reinforcing manner, said resilient guard including generally horizontally disposed cross bars which are located at a vertically-spaced distance from respective guide bars, said cross bars including portions protruding beyond a generally vertical boundary plane delimiting the rigid support, and fastening link means for interconnecting only the protruding portions of the cross bars beyond the generally vertical boundary plane to thereby indirectly secure the guard to the rigid support.

2. The bumper defined in claim 1, wherein the fastening link means is U-shaped in cross section with a connecting bar and legs, the connecting bar being disposed adjacent to said boundary plane with said fastening link means interconnecting said protruding portions of the cross bars.

3. The bumper defined in claim 2, wherein, at least on one end of the fastening link means is connected to a protruding portion of one of the respective cross bars by one of bolts, rivets and the like.

4. The bumper defined in claim 2 or 3, wherein, at least one end of the fastening link means penetrates an opening in a protruding portion of a respective cross bar and embraces a side surface of the protruding portion adjacent said opening.

5. The bumper defined in claim 1, wherein the cross bars and the fastening link means are provided only locally.

6. The bumper defined in claim 1, wherein the holding fixtures are hook-like and the guide bars are provided with ribs, which, together with the guide bars, protrude into the hook-like holding fixtures of the rigid support.

7. The bumper defined in claim 1, wherein the guard has generally vertically extending ribs laterally bounding the rigid support, the ribs being provided with slot openings, and wherein hook-like clamps are attached to the rigid support, said clamps penetrating the slot openings and embracing a laterally outer side of the ribs.

8. The bumper defined in claim 1 or 2, the cross bars including a plurality of cross bars arranged in horizontally spaced and vertically aligned pairs of upper and lower cross bars, each pair having a respective vertically-oriented fastening link interconnecting the protruding portion of its upper and lower cross bars.

9. The bumper defined in claim 4, wherein the cross bars include a plurality of cross bars arranged in horizontally spaced and vertically aligned pairs of upper and lower cross bars, each pair having a respective vertically-oriented fastening link interconnecting the protruding portion of its upper and lower cross bars.

* * * * *